United States Patent [19]

Carpenter

[11] Patent Number: 4,777,833
[45] Date of Patent: Oct. 18, 1988

[54] FERROMAGNETIC DRIVE AND VELOCITY SENSORS FOR A CORIOLIS MASS FLOW RATE METER

[75] Inventor: Brent L. Carpenter, Boulder, Colo.

[73] Assignee: Micro Motion, Inc., Boulder, Colo.

[21] Appl. No.: 929,979

[22] Filed: Nov. 12, 1986

[51] Int. Cl.⁴ .............................................. G01F 1/84
[52] U.S. Cl. ................................................ 73/861.38
[58] Field of Search ............ 73/861.38, 861.37, 32 A, 73/654, 668; 336/110, 136; 177/210 EM, 212

[56] References Cited

U.S. PATENT DOCUMENTS

| | | | |
|---|---|---|---|
| 4,127,028 | 11/1978 | Cox et al. | 73/32 A |
| 4,187,721 | 2/1980 | Smith | 73/194 |
| 4,192,184 | 3/1980 | Cox | 73/194 |
| 4,339,953 | 7/1982 | Iwasaki | 73/654 |
| 4,422,338 | 12/1983 | Smith | 73/861.38 |
| 4,491,025 | 1/1985 | Smith et al. | 73/861.38 |
| 4,622,858 | 11/1986 | Mizerak | 73/861.38 |
| 4,623,840 | 11/1986 | Fujimura et al. | 324/208 |
| 4,628,744 | 12/1986 | Lew | 73/861.38 |
| 4,660,421 | 4/1987 | Dahlin et al. | 73/861.38 |
| 4,691,578 | 9/1987 | Herzl | 73/861.38 |
| 4,711,132 | 12/1987 | Dahlin | 73/861.38 |
| 4,730,501 | 3/1988 | Levien | 73/861.38 |

FOREIGN PATENT DOCUMENTS

| | | |
|---|---|---|
| 0083144 | 7/1983 | European Pat. Off. |
| WO05677 | 12/1985 | World Int. Prop. O. |
| WO00699 | 1/1986 | World Int. Prop. O. |

OTHER PUBLICATIONS

Patent Abstracts of Japan, vol. 7 No. 231, 13 Oct. 1983, p. 229 [1376].

*Primary Examiner*—Stewart J. Levy
*Assistant Examiner*—Robert P. Bell
*Attorney, Agent, or Firm*—John V. Pezdek; Peter L. Michaelson

[57] ABSTRACT

A coriolis mass flow meter which includes a ferromagnetic drive mechanism and ferromagnetic velocity sensors is disclosed. The drive mechanism includes a drive coil; a ferromagnetic drive keeper affixed to a flow conduit of the meter so that the keeper it is partially disposed in the field from the drive coil; a magnet for orienting the ferromagnetic domains of the drive keeper; and means for applying a drive signal to the drive coil. The velocity sensor includes a sensor coil; a ferromagnetic sensor keeper affixed to the flow conduit so that the keeper it is partially disposed in the field drawn across the sensor coil; a magnet for orienting the ferromagnetic domains of the sensor keeper, disposed so that a portion of its magnetic field passes through the sensor coil; and means for detecting a current induced in the sensor coil by changes in the sensor keeper position. The drive mechanism oscillates the flow conduit in response to the variable magnetic field produced by the drive signal. As a side leg of the flow conduit oscillates in response to the drive mechanism and Coriolis forces, so too does the ferromagnetic sensor keeper. As a result, the magnetic field passing through the sensor coil varies and a signal is induced therein which provides a measure of the velocity of the side leg of the flow conduit.

21 Claims, 9 Drawing Sheets

MASS FLOW CIRCUIT
30

(FLOW (POSITIVE DIRECTION))

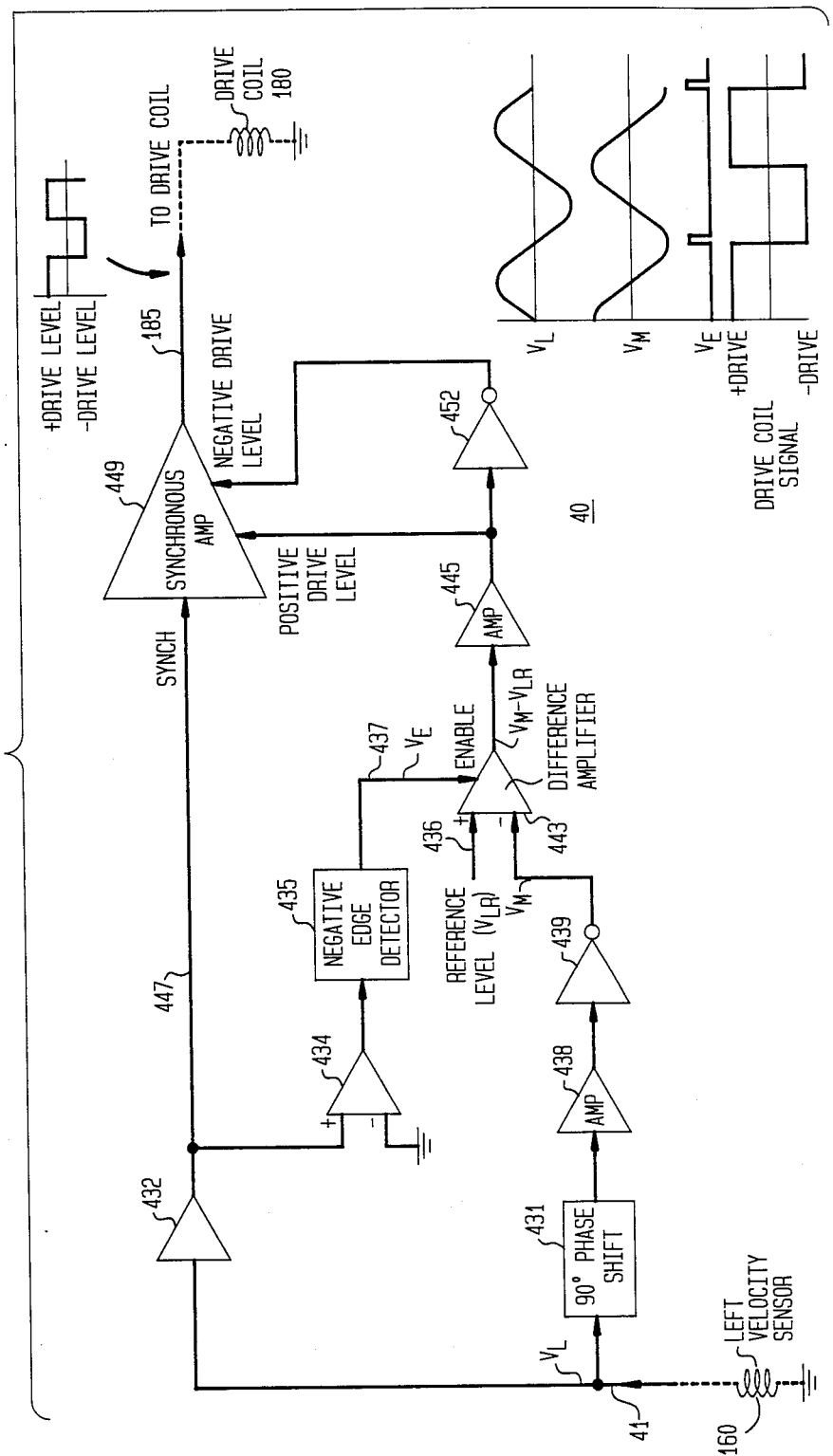

FERROMAGNETIC DRIVE AND VELOCITY SENSORS FOR A CORIOLIS MASS FLOW RATE METER

BACKGROUND OF THE INVENTION

1. Field of the Invention

The invention relates to apparatus for a Coriolis mass flow meter and, in particular, to apparatus for driving a flow conduit used in such a meter and to apparatus for sensing the velocity of the flow conduit.

2. Description of the Prior Art

Coriolis mass flow meters can be used to measure the mass flow of a process fluid. As disclosed in the art, such as in U.S. Pat. No. 4,491,025 (issued to J. E. Smith et al on Jan. 1, 1985 and hereinafter referred to as the U.S. Pat. No. 4,491,025), a Coriolis mass flow meter contains one or two parallel conduits, each typically being a U-shaped flow conduit. Each flow conduit is driven to oscillate about an axis to create a rotational frame of reference. For a U-shaped flow conduit, this axis can be termed the bending axis. As process fluid flows through each oscillating flow conduit, movement of the fluid produces reactionary Coriolis forces that are perpendicularly oriented to both the velocity of the fluid and the angular velocity of the conduit (tube). These reactionary Coriolis forces cause each conduit to twist about a torsional axis that for a U-shaped flow conduit is normal to its bending axis. The amount of twist is proportional to the mass flow rate of the process fluid that flows through the tube.

Coriolis mass flow meters which would utilize small diameter flow conduits, i.e. 0.065" (1.65 mm) OD and 0.125" (3.17 mm) OD tubes, often use only a single flow conduit. The reason for this is that the combined mass represented by the flow conduit and the fluid moving therethrough is substantially less than the mass of the base that supports the flow conduit. Consequently, the base remains substantially rigid when the flow conduit and fluid oscillate. Such a single tube Coriolis mass flow meter is described in U.S. pat. No. Re 31,450. With larger diameter tubes, starting at about 0.25" (6.35 mm) OD, the combined mass of each tube and the fluid represents a much greater proportion of the total mass of the system and, as a result, with such large diameter tubes it is preferable to use a parallel multi-conduit apparatus such as that described in the U.S. Pat. No. 4,491,025.

As disclosed in the above-referenced U.S. patents, a typical Coriolis mass flow meter uses a drive mechanism to oscillate the flow conduit(s) and magnetic velocity sensors to determine the relative velocity of the side legs of a typical flow conduit. Further, a magnet, which forms part of the drive mechanism, and magnetic velocity sensing pick-off coils are usually mounted directly to the flow conduit in a typical single tube Coriolis mass flow meter. For example, in one embodiment known in the art, a 0.062" diameter by 0.343" (1.57 mm by 8.71 mm) cylindrical ALNICO permanent magnet is used as part of the drive mechanism. In such meters, the combined mass of the drive magnet and the pick-off coils, together with their leads, can represent a substantial portion of the total mass of a flow conduit assembly.

Efforts have been made to reduce this mass. For example, coils are often wound with 50 gauge wire. However, because 50 gauge wire is very fine, i.e. finer than human hair, this wire is easily broken. In addition, care must be taken during fabrication of the coil to ensure that the wire is not overstressed to the point where the wire breaks or causes shorted turns within the coil.

Another problem occurring with tube-mounted coils, other than the increased mass, involves the lead wires connected to the coils.

These lead wires are typically wound around the legs of a flow conduit and are typically fastened to the flow conduit using an adhesive, such as lacquer. As a consequence, damping or driving forces are coupled to the oscillating flow conduit via the lead wires and disadvantageously alter the motion of the flow conduit and thereby cause measurement errors. This error is unacceptable in certain applications. Specifically, damping forces typically arise from two sources: (1) friction arising between wires themselves or, in some arrangements, between the wires and adjacent structure—it has been discovered that these frictional forces arise even where the insulating material on the wires is a synthetic resin polymer lubricating material such as is sold under the trademark TEFLON (TEFLON is a trademark of the Dupont Corporation)—and (2) the internal structure of the wire material itself. Driving forces typically arise from adjacent vibrating machinery.

The above-described problem caused by coupling damping or driving forces to the flow conduit is exacerbated when wires are wrapped or attached to more than one portion of a flow conduit. This occurs because the damping or driving forces that are coupled to the legs of a U-shaped flow conduit are generally unequal. As a result, the tube can twist under the influence of the different forces, which additional twist can mask the twisting action caused by the Coriolis forces.

Attempts to alleviate some of the above-identified problems include wrapping or affixing wires, for example, by glue or tape, to a flow conduit. Because the wires are oriented substantially parallel to the tube to which they are affixed, these wires are substantially prevented from kinking.

An additional problem that occurs with respect to the wires is fatigue. If the mechanical characteristics of the wires are at least equivalent to or better than those of the oscillated structure, mechanical fatigue of the wires presents an engineering problem that is comparable to that for the oscillated structure. However, whenever wires are wrapped, taped or glued to a flow conduit, additional mass is often added to the flow conduit. This additional mass arises from either the additional length of wire required when wires are wound around the flow conduits or from the added tape or glue. This additional mass can alter the oscillatory motion of the conduit. In addition, because the effects of humidity and temperature on glue are not uniform, differential damping induced by the glue can also alter the oscillatory motion of the tube.

As a result, in fabricating Coriolis mass flow meters it would be advantageous to be able to use reduced mass drive mechanisms and velocity sensors, to reduce the coupling of driving and/or damping forces to the flow conduits, to reduce the problems of friction and temperature, and to ease assembly of the pick-off coils by allowing larger gauge wire to be used in their construction.

SUMMARY OF THE INVENTION

Embodiments of the present invention provide ferromagnetic drive means and ferromagnetic velocity sensors for use in Coriolis mass flow meters wherein flow conduits comprising the meter are free of magnets and coils. Such embodiments of the present invention advantageously allow use of larger gauge wire for coils and thereby ease coil assembly problems; allow use of smaller diameter flow conduits than are typically used at present, such as 0.254 mm OD or 0.762 mm OD flow conduits—the use of such small diameter flow conduits is presently precluded because presently available coils, even those wound with 50 gauge wire, have a mass which represents too large a fraction of the combined mass of the tube and the fluid contained therein; and allow removal of the coil wire leads and their fastening means from the tube, with the resultant decrease in the mass of the tube assembly.

The inventive drive means comprises a coil, a ferromagnetic keeper, disposed so that a portion thereof is covered by the field from the coil; a magnet, disposed so that its magnetic field orients the ferromagnetic domains of the keeper; and means for applying a signal to the coil for providing a variable magnetic field. The inventive drive means is used in an inventive Coriolis mass flow meter by affixing the keeper to a flow conduit thereof by, for example, brazing. As a result, as the keeper is oscillated in response to the variable magnetic field produced by the signal, so too is the flow conduit.

The inventive velocity sensor comprises a coil, a ferromagnetic keeper, disposed so that a portion thereof is covered by the field from the coil; a magnet, disposed so that its magnetic field orients the ferromagnetic domains of the keeper and so that a portion of its magnetic field passes through the coil; and means for detecting a current induced in the coil as the keeper changes position inside the coil, thereby varying the magnetic field that passes through the coil. The inventive velocity sensor is used in an inventive Coriolis mass flow meter by affixing the keeper to a flow conduit thereof by, for example, brazing. As a result, as the flow conduit is oscillated in response to the drive means, so too is the keeper. As a result, the magnetic field passing through the coil varies and a signal is induced therein which provides a measure of the velocity of the keeper and, thereby, the velocity of the flow conduit.

The following describes a preferred embodiment of a Coriolis mass flow meter utilizing an inventive drive means, inventive velocity sensors, and a solidly mounted U-shaped flow conduit. The drive means is used to oscillate the flow conduit substantially at its resonant frequency about its bending axis and the outputs from the velocity sensors provide signals that are substantially linearly representative of the actual moment of the flow conduit over its path of motion. As a result of the Coriolis forces, one of the side legs of the U-shaped flow conduit either leads or lags in time with respect to the other side leg. This time lag between these two signals is measured with respect to an arbitrary reference point in the path of oscillation of the flow conduit. This time lag is a linear function of the mass flow rate of the fluid passing through the flow conduit, i.e., the relationship between the measured time lag and the mass flow rate of fluid passing through the flow conduit is dependent only on constants derived form the mechanics of the flow conduit and its solid mounting.

The inventive drive means and the inventive velocity sensor can be used in a single or multi-tube Coriolis mass flowmeter.

BRIEF DESCRIPTION OF THE DRAWING

The principles of the present invention may be clearly understood by considering the following detailed description in conjunction with the accompanying drawings, in which:

FIG. 8 is a block diagram of Flow Tube Drive Circuit 40, shown in FIG. 6;

To facilitate understanding, indentical reference numerals have been used to denote identical elements common to the figures.

DETAILED DESCRIPTION

Figure 1:
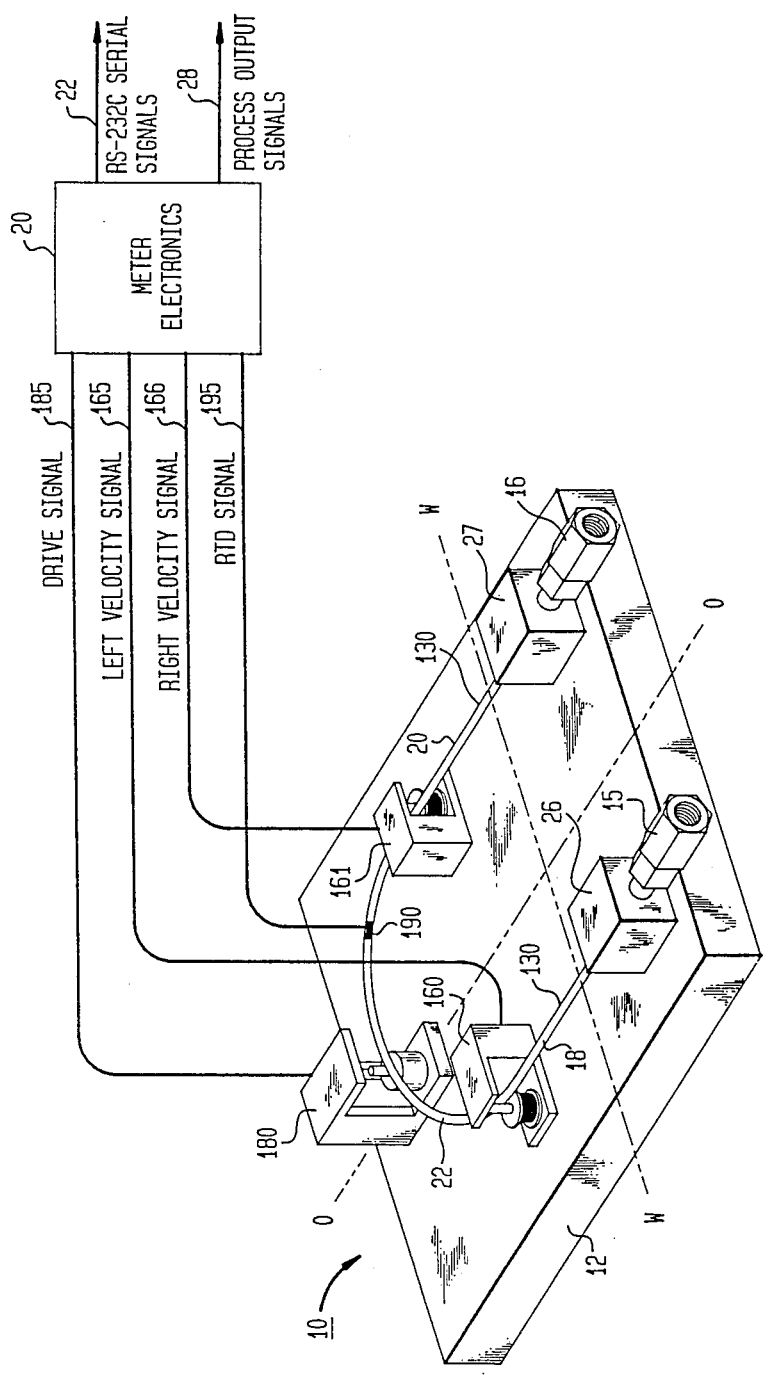
FIG. 1 is an overall diagram of a metering system which embodies the teachings of the present invention.

FIG. 1 shows an overall diagram of a Coriolis mass flow metering system embodying the principles of the present invention and, in particular, a mass flow metering system which utilizes an inventive ferromagnetic drive mechanism and inventive velocity sensors. The described system can be used to measure the density of an unknown fluid.

Specifically, as shown, the inventive mass flow metering system consists of two basic components: Coriolis meter assembly 10 and meter electronics 20. As shown, Coriolis meter assembly 10 includes mounting platform 12 to which a substantially U-shaped flow conduit 130, free of pressure sensitive joints, is mounted by means of conduit support structure 26 adjacent inlet port 15 and conduit support structure 27 adjacent outlet port 16 in a fashion for rotational oscillation in a region about axis W-W. Side legs 18 and 20, as well as transverse connecting portion 22 extending therebetween are provided. U-shaped flow conduit (tube) 130 is preferably of a tubular material having resiliency such as is normally found in such materials such as beryllium, copper, titanium, aluminum, steel, alloys of these materials, plastics and so forth. Though described as U-shaped, flow conduit 130 may be S-shaped, looped or have legs which converge, diverge, or are skewed substantially. In addition, the flow conduit can be straight. Preferably, side legs 18 and 20 are parallel and transverse leg 22 is perpendicular to both; but, as mentioned above, substantial deviations from the ideal configuration do not appreciably compromise results. Inventive drive mechanism 180 has a first portion affixed to flow conduit 130 and a second portion affixed to mounting platform 12. Drive mechanism 180, in response to meter electronics 20, drives U-shaped flow conduit 130 substantially at its natural or resonant frequency about axis W—W in an oscillating manner, preferably sinusoidal, around inlet port 15 and outlet port 16. Inventive velocity sensor 160 has a first portion affixed to side leg 18 of flow conduit 130 and a second portion affixed to mounting platform 12. Inventive velocity sensor 161 has a first portion affixed to side leg 20 of flow conduit 130 and a second portion affixed to mounting platform 12. As a preferred embodiment, for a given shape of flow conduit, sensors 160 and 161 are disposed at the location of maximum Coriolis force action. For the U-shaped flow conduit this would be adjacent the intersections of transverse leg 22 and side legs 18 and 20, respectively.

Drive mechanism 180 is activated by meter electronics 20 to rotationally oscillate U-shaped flow conduit 130 about axis W—W, with resulting Coriolis force deflection of flow conduit 130 about axis O—O. Drive mechanism 180 has substantially the same resonant frequency as flow conduit 130 whenever the latter is filled with fluid in the same range as that of the fluid whose mass flow rate and/or density is to be determined. As taught by U.S. Pat. No. 4,187,721, the frequency of oscillation of flow conduit 130 about axis W—W should be different from the frequency of oscillation about axis O—O, and most preferably that the resonant frequency of oscillation about axis W—W should be lower than the frequency of oscillation about axis O—O. This relationship ensures that the predominant force opposing the Coriolis force couple is the resilient spring distortion of U-shaped flow conduit 130 about axis O—O. This thus obviates the need for, and the complication of, measuring velocity drag restorative forces and inertial opposing forces. Once these two frequencies have been selected, the geometry of the flow conduit can be designed using well known techniques so that the resulting flow conduit will oscillate at the chosen frequencies.

With side legs 18 and 20 of tube 130 fixedly attached to tube inlet port 15 and outlet port 16, respectively, as shown in FIG. 1, a continuous closed fluid path is provided through Coriolis mass meter assembly 10. Specifically, when meter 10 is connected, via inlet port 15 and outlet port 16, to a conduit system (not shown), fluid enters the meter through an orifice in inlet port 15 and is routed through flow conduit 130. Upon exiting flow conduit 130, the fluid is routed through outlet port 16 back into the conduit system.

U-shaped flow conduit 130 has a bending axis W—W which is substantially perpendicular to side legs 18 and 20 of U-shaped flow conduit 130 and which is located near tube inlet 15 and tube outlet 16. Inasmuch as the spring constant of tube 130 changes with temperature, resistive temperature detector (RTD) 190 (typically a platinum RTD device) is mounted thereon to continuously measure the temperature of the tube. The temperature of tube 130 and hence the voltage appearing across the RTD, for a given current passing therethrough, will be governed by the temperature of the fluid passing through flow conduit 130. The temperature dependent voltage appearing across the RTD is used, as discussed in detail later, by meter electronics 20 to appropriately compensate the value of the spring constant of the flow tube for any changes in tube temperature. The RTD is connected to meter electronics 20 by lead 195.

Flow conduit 130 is sinusoidally driven about its bending axis at essentially its resonant frequency in order to minimize the drive power required to oscillate the flow conduit. Drive mechanism 180 supplies the sinusoidal oscillatory driving force to tube 130. A suitable oscillatory drive signal, as discussed in detail below in conjunction with FIG. 8, is applied by meter electronics 20, via lead 185, to drive mechanism 180.

Figure 2:
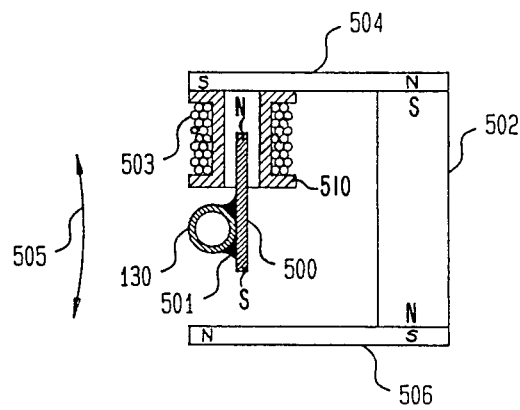
FIG. 2 is a sectional view of a ferromagnetic drive means fabricated in accordance with the present invention.

FIG. 2 shows a sectional view of ferromagnetic drive means 180 (see FIG. 1) fabricated in accordance with the present invention. As shown in FIG. 2, ferromagnetic keeper 500 is brazed to the outer wall of flow conduit 130, which flow conduit is fabricated, in this embodiment, from HASTELLOY C alloy which is a trademark of the Cabot Corporation of Kokomo, Ind. and is a well-known nickel-based alloy used for handling corrosive materials. In this embodiment, ferromagnetic keeper 500 is affixed to flow conduit 130 by brazement 501 and comprises a strip of a ferromagnetic material, for example, type 430 stainless steel. External magnet 502 is affixed to base 12 of Coriolis mass meter 10 and comprises a cylindrical permanent magnet. This magnet is attached to pole pieces 504 and 506. External magnet 502 is positioned in a manner known to those of ordinary skill in the art to align the ferromagnetic domains of keeper 500. It is known in the art that keeper 500 will exhibit a dipole moment which is proportional to the permeance of the keeper material and the field strength of magnet 502 whenever keeper 500 is placed in the field of magnet 502. As a result, keeper 500 acts as a small magnet.

Figure 2A:
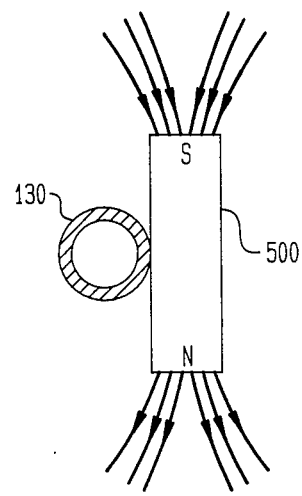
FIG. 2A shows, in pictorial form, magnetic flux lines in the vicinity of the keeper of the ferromagnetic drive shown in FIG. 2.
Figure 2B:
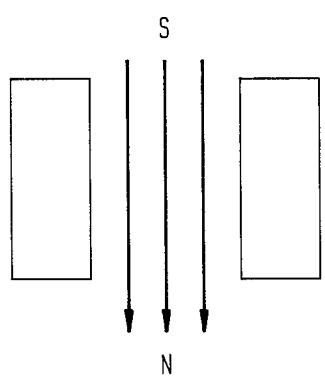
FIGS. 2B and 2C show, in pictorial form, the magnetic flux in the vicinity of coil 503 of the ferromagnetic drive shown in FIG. 2.
Figure 2C:
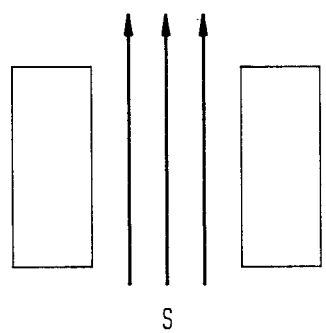
Figure 2D:
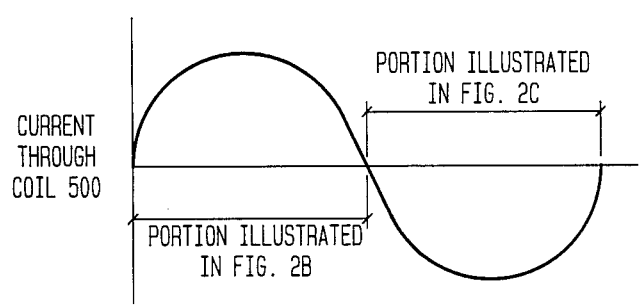
FIG. 2D shows, in pictorial form, the applied periodic current applied to the coil of the ferromagnetic drive shown in FIG. 2.

Coil 503 is positioned so that keeper 500 will be influenced by the magnetic field thereof. In the disclosed embodiment coil 503 is formed of insulated wire wound on annularly shaped bobbin 510. Alternately, the coil can be wound in an annular shape and encapsulated. Where the wire is of sufficient gauge to maintain its shape, the encapsulation can be eliminated if desired. As is known in the art, coil 503 acts as an electromagnet when current is applied thereto. Further, when an alternating current, such as a sinusoidally varying current, is applied to coil 503, an alternating magnetic field is produced in the coil. When the alternating magnetic field interacts with the steady field surrounding keeper 500, the alternating field causes a displacement of tube 130 along the direction shown by arrow 505. The magnetic field produced by external magnet 502 will orient the magnetic domains within keeper 500 establishing north and south poles as indicated by the letters N and S, respectively, in FIG. 2. The magnetic flux in the vicinity of the keeper 500 can be represented as a series of parallel lines as shown in FIG. 2A. Likewise, the magnetic field produced by coil 503 when passing a sinusoidal current can be represented as a series of parallel lines as shown in FIGS. 2B and 2C. This field will reverse direction as the current applied to coil 500 reverses polarity. For illustrative purposes, the magnetic field is assumed to be as shown in FIG. 2B during the positive half cycle of the applied periodic current as shown in FIG. 2D. The field as shown in FIG. 2C will be reversed during the negative half cycle of the current waveform of FIG. 2D. Here, keeper 500 will be drawn into coil 503 during positive half cycles due to the attraction of opposite magnetic poles in the keeper 500 and coil 503. Keeper 500 will be pushed away from the coil during negative half cycles due to repulsion of like magnetic poles in the keeper 500 and coil 503.

In an alternate embodiment, external magnet 502 can be removed, and flow tube 130 can be vibrated using only coil 503 and keeper 500. With this arrangement, as the magnetic field produced by coil 503 is increased, keeper 500 is drawn into coil 503. Conversely, when the magnetic field decreases in magnitude, the force exerted on keeper 500 decreases and flow conduit 130 returns to a neutral position. An AC drive current or a pulsed DC drive current can be used. However, in comparison to the embodiment using the external magnet 502, the magnitude of the current applied to the coil 503 must be greatly increased (by a factor of 20 to 30 times) to generate a magnetic field having sufficient strength so as to achieve the same degree of displacement of flow conduit 130 that is possible when using the external magnet. Also with this alternate embodiment, the movement of flow conduit 130 is asymmetric. However, the movement of flow conduit 130 can be made symmetric, if required for a specific application, by placing a second coil (not shown) adjacent the other end of the keeper and away from coil 503, extending keeper 500 so that the extended portion is partially inserted into the second coil and alternating the drive current between the two coils.

As should be clear to those of ordinary skill in the art, the displacement of keeper 500 and, thereby, that of flow conduit 130, is increased by increasing the current flowing through drive coil 503. It should also be clear those of ordinary skill in the art that other ferromagnetic materials can be used in fabricating keeper 500 in place of type 430 stainless steel. For example, such materials as Mumetal and carbon steel may also be used. In addition, I have made the following observations concerning a fixed peak-to-peak displacement of keeper 500:

(1) as the volume of ferromagnetic alloy keeper 500 increases, drive power decreases, as indicated by a decrease in peak-to-peak voltage across drive coil 503; and (2) keeper materials having relatively higher levels of magnetization, i.e. materials that do not saturate as the external magnetic field increases, result in lower drive coil voltages. For example, a unit volume of Mumetal, which saturates at approximately 6500 gauss, produces a higher voltage in drive coil 503 than does a unit volume of carbon steel, which saturates at approximately 21,500 gauss.

It should be clear to those skilled in the art that keeper 500 may assume various shapes other the strip shown in FIG. 2. For example, keeper 500 may attain the shape of a cylinder.

As long as fluid flows through flow conduit 130 while being oscillated, Coriolis forces will be generated alongside legs 18 and 20 of flow conduit 130. During oscillation of the flow conduit, one side leg, will pass through its mid-plane of oscillation before the other leg will pass through its corresponding mid-plane of oscillation. The time interval which elapses from the instant one side leg passes through its mid-plane of oscillation to the instant the other side leg passes through its respective mid-plane of oscillation is proportional to the total mass flow rate of the fluid flowing through meter assembly 10. The reader is referred to the U.S. Pat. No. Re. 31,450 (reissued to J. E. Smith on Feb. 11, 1982) for a far more detailed discussion of the principles of operation of such a Coriolis flow meter than that just presented and, specifically, for the teaching that the mass flow rate can be determined from measurement of such time intervals.

To measure the time interval occurring between passage of the flow conduit side legs through their respective mid-planes of oscillation, velocity sensors 160 and 161 are positioned near the free end of flow conduit 130. With this configuration, the electrical signal outputs generated by velocity sensors 160 and 161 provide a velocity profile of the complete travel of flow conduit 130 and can be processed, as set forth in detail later, to determine the time interval and, in turn, the mass flow rate. In particular, velocity sensors 160 and 161 produce the left and right velocity signals that appear on leads 165 and 166, respectively. The fact that the midplane of oscillation is used as a timing reference point should not be considered as a limitation. Any predetermined point in the velocity signal can be used as the reference point for the time interval measurement or phase shift that occurs between these two signals.

Figure 3:
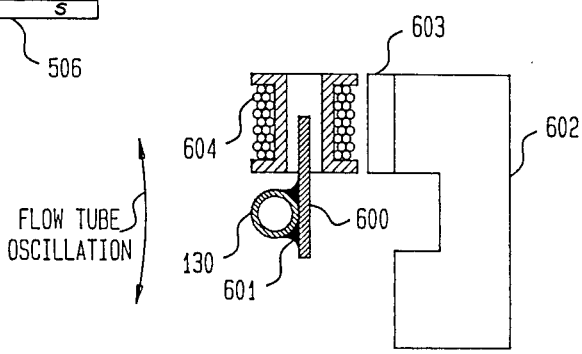
FIG. 3 is a sectional view of a ferromagnetic velocity sensor fabricated in accordance with the present invention.

FIG. 3 shows a sectional view of ferromagnetic velocity sensor 160 or 161 (see FIG. 1) fabricated in accordance with the present invention. As shown in FIG. 3, ferromagnetic keeper 600 is brazed to the outer wall of flow conduit 130, which flow conduit is fabricated, in this embodiment, from HASTELLOY C alloy. In this embodiment, ferromagnetic keeper 600 is affixed to flow conduit 130 by brazement 601 and comprises a strip of a ferromagnetic material, for example, type 430 stainless steel. External magnet 602 is affixed to base 12 of Coriolis mass meter 10 and comprises a U-shaped magnet. Magnet 602 is positioned so that a magnetic field emanating therefrom impinges upon coil 604, similar in construction to coil 503 (see FIG. 2). As shown in FIG. 3, this is accomplished by disposing sensor coil 604 at substantially the same vertical level as a pole of magnet 602. U-shaped magnet 602 is positioned in a manner known to those of ordinary skill in the art to align the ferromagnetic domains of keeper 600. It is known in the art that keeper 600 will exhibit a dipole moment which is proportional to the permeance of the keeper material and the field strength of magnet 602 whenever keeper 600 is placed in the field of magnet 602. As a result, as is known in the art, keeper 600 acts as a small magnet. Optional pole piece 603, made, for example, from cold rolled steel or any other suitable magnetically permeable material, is provided merely to allow for positioning adjustments between magnet 602 and keeper 600.

Sensor coil 604 is positioned so that keeper 600 will partially extend into the interior thereof. As flow conduit 130 oscillates under the driving force applied by driver mechanism 180 (see FIG. 1), the motion of keeper 600 (shown in FIG. 3) within sensor coil 604 causes the magnetic flux to change. That change, in turn, induces a voltage in sensor coil 604 whose amplitude is proportional to the dipole moment and velocity of keeper 600. It will be clear to those of ordinary skill in the art that the magnetic field produced by magnet 602 or pole piece 603 will not induce a voltage in sensor coil 604 because that magnetic field does not vary with respect to time.

Figure 4:
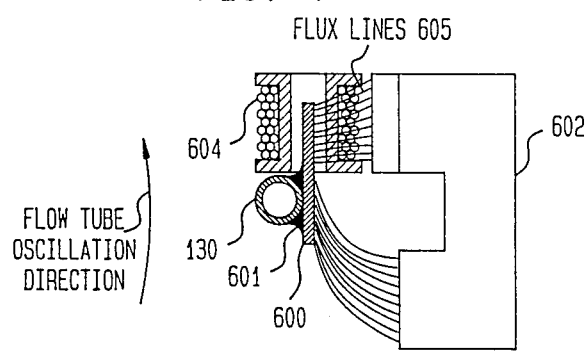
FIGS. 4 and 5 are sectional views of the ferromagnetic velocity sensor shown in FIG. 3 with magnetic flux lines in various positions of displacement of keeper 600.
Figure 5:
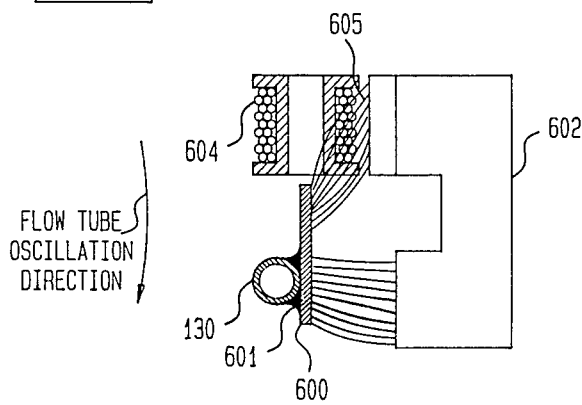

FIGS. 4 and 5 show the magnetic flux lines 605 emanating from magnet 602 and how they vary when flow conduit 130 has been displaced in either an upward direction or downward direction, as shown in FIGS. 4 and 5 respectively. In FIG. 4, the flux path is distorted because keeper 600, a ferromagnetic strip, offers a lower reluctance path for the magnetic flux relative to the surrounding air. As shown in FIG. 5, displacement of keeper 600 further distorts the field lines because the flux lines will follow the shortest air path to keeper 600. If keeper 600 is displaced in a sinusoidal manner, the magnetic field will induce a voltage in a suitably placed coil such as coil 604. The net current induced thereby will be a function of the rate of change of the magnetic flux and hence the velocity of the keeper. The induced current is also a function of external magnetic strength and coil parameters in a manner which is known in the art, i.e., the higher the flux density or the higher the number of turns in coil 604, the greater the induced current. Additionally, it should be clear to those of ordinary skill in the art that the U-shaped magnet shown in FIGS. 3–5 may be replaced with other appropriate magnet configurations such as, for example, a cylindrical magnet having appropriate pole pieces or an electromagnet which is supplied by a relatively constant current.

As noted above and shown in FIG. 1, meter electronics 20 accepts as input the RTD signal appearing on lead 195, and right and left velocity signals appearing on leads 165 and 166, respectively. Meter electronics 20 also produces, as noted, the sinusoidal drive signal appearing on lead 185. The meter electronics, as explained below, processes both velocity signals and the RTD signal to determine the mass flow rate of the fluid passing through meter assembly 10. The output information is also provided by meter electronics 20 on leads 28 in analog form, illustratively 4–20 mA signals and frequency outputs for easy interfacing to other process control equipment, and on leads 22, in serial RS-232C form.

Figure 6:
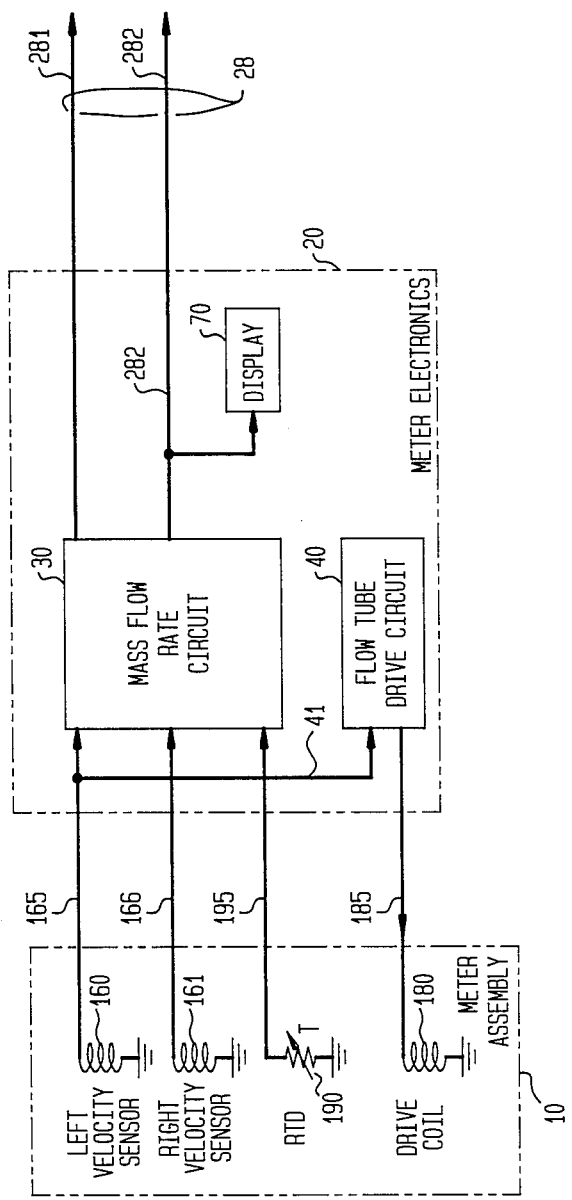
FIG. 6 is a block diagram of Meter Electronics 20 shown in FIG. 1.

A block diagram of meter electronics 20 is depicted in FIG. 6. Here, as shown, meter electronics 20 consists of mass flow rate circuit 30, flow tube drive circuit 40 and display 70.

Mass flow rate circuit 30 processes the left and right velocity signals appearing over leads 165 and 166, respectively, along with the RTD signal appearing on lead 195, as explained in detail below in conjunction with FIG. 7, to determine the mass flow rate of the fluid passing through meter assembly 10. The resulting mass flow rate information is provided as a 4–20 mA output signal over lead 281, for easy connection to additional process control equipment, and as a scaled frequency signal over lead 282 for easy connection to a remote totalizer. The signals appearing on leads 281 and 282 form the process signals that collectively appear on leads 28 shown in FIG. 1.

Flow tube drive circuit 40, depicted in FIG. 6 and as explained in detail in conjunction with FIG. 8, provides a square wave drive signal, via lead 185, to drive drive mechanism 180. This circuit synchronizes the square wave drive signal to the left velocity signal which appears on leads 165 and 41.

Figure 7:
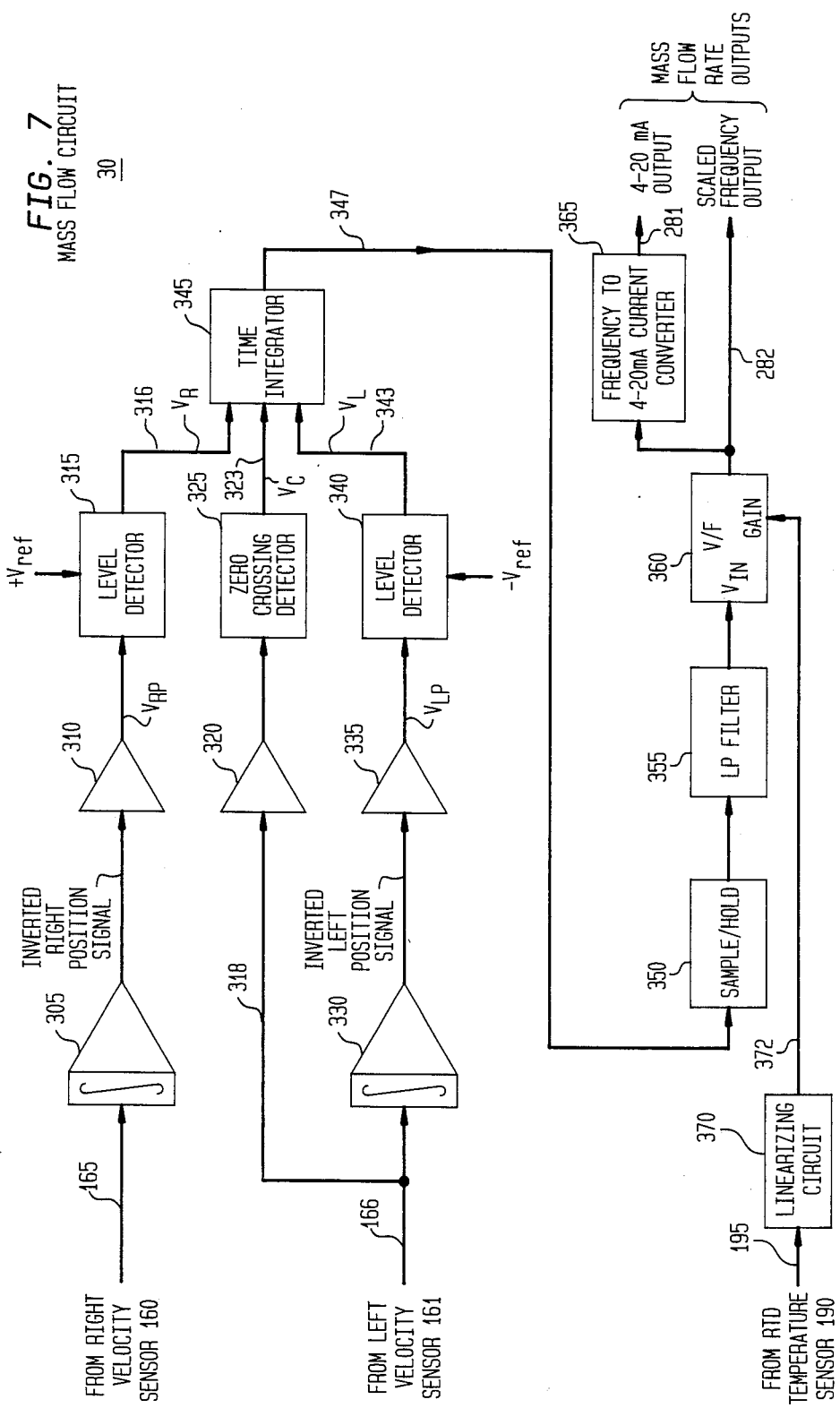
FIG. 7 is a block diagram of Mass Flow Rate Circuit 30, shown in FIG. 6.
Figure 7A:
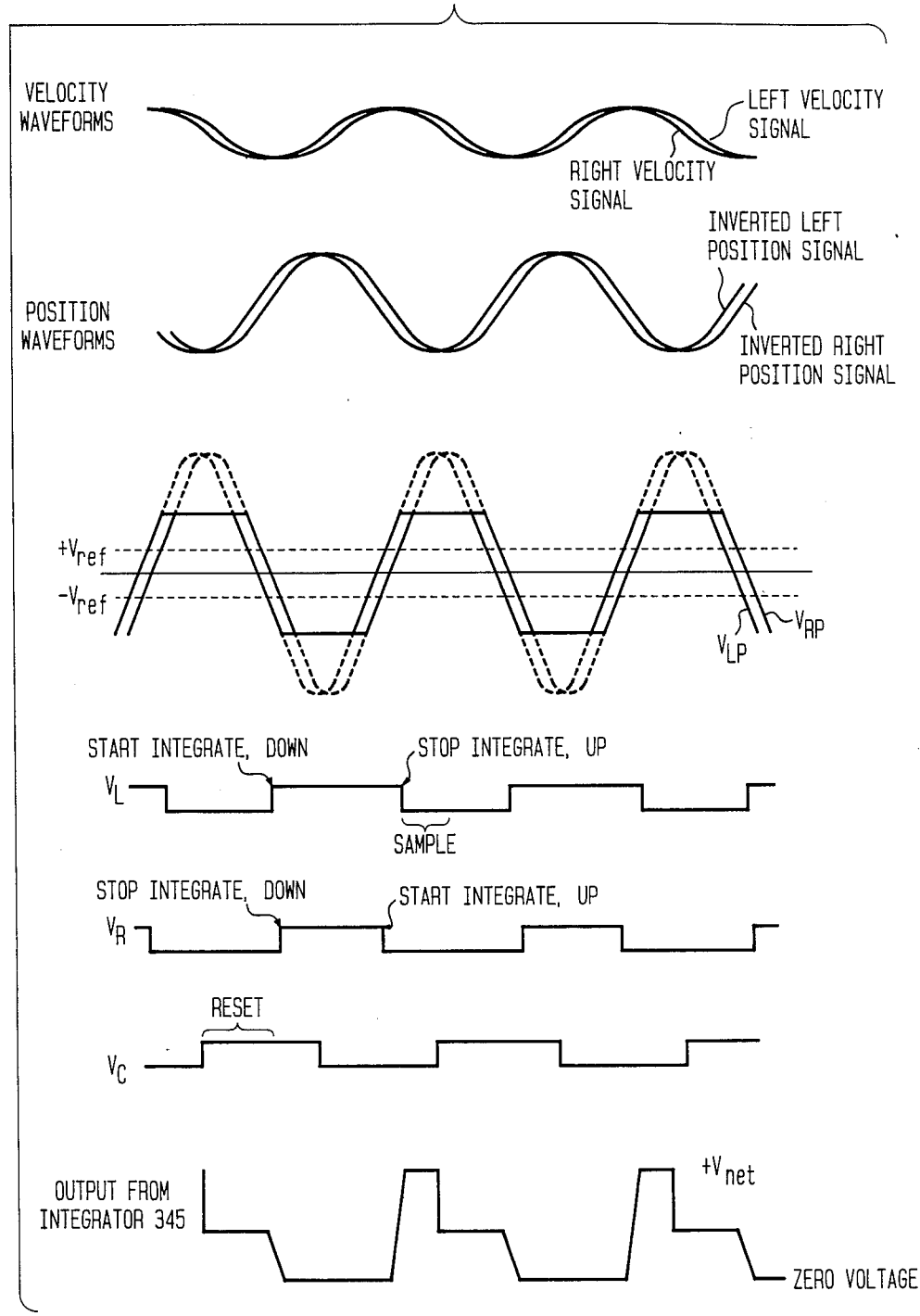
FIG. 7A depicts various waveforms that occur within Mass Flow Rate Circuit 30 shown in FIG. 6 for conditions of positive flow.
Figure 7B:
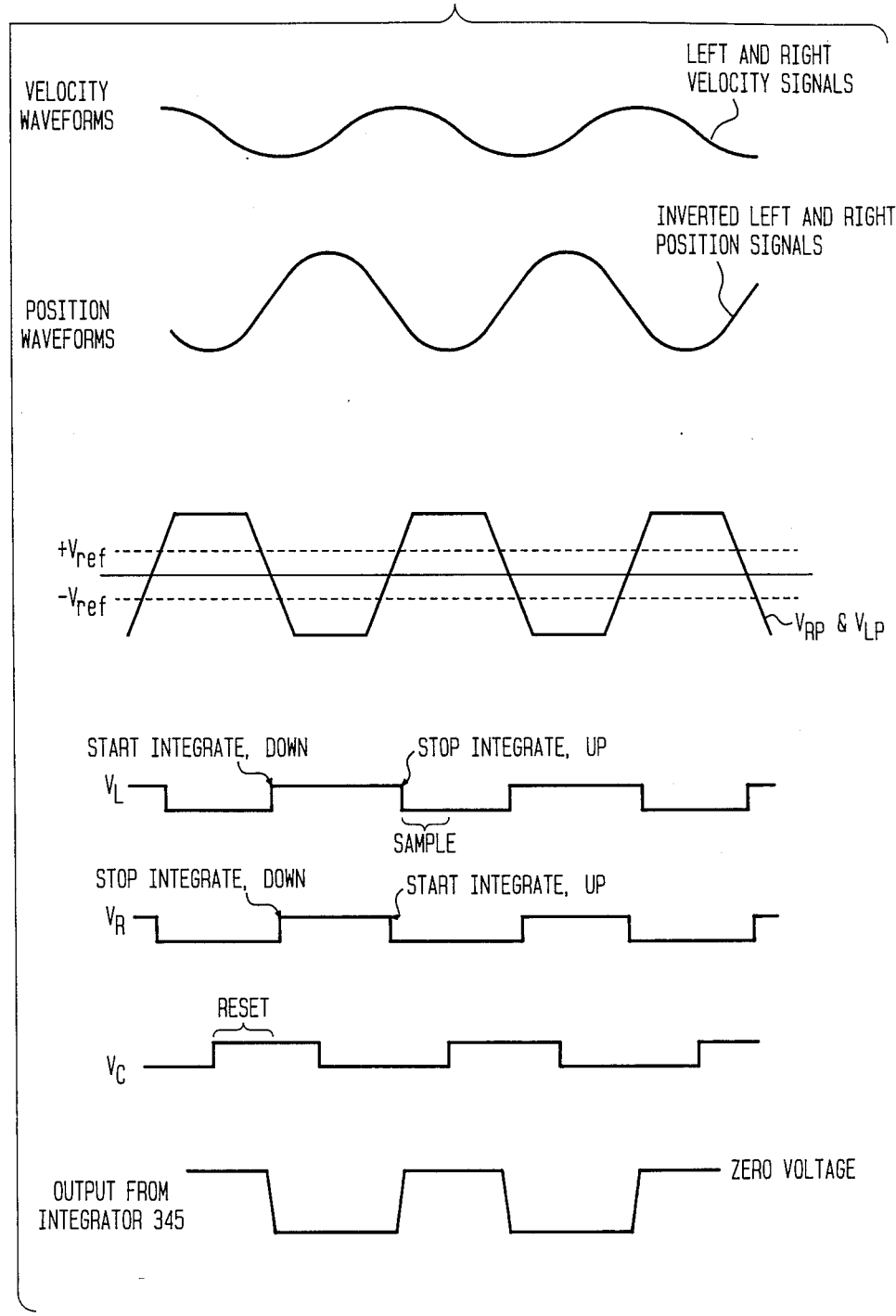
FIG. 7B depicts corresponding waveforms to those shown in FIG. 7A for conditions of no flow.

FIG. 7 depicts a block diagram of mass flow rate circuit 30, shown in FIG. 6, with the corresponding waveforms generated by this circuit under conditions of positive flow shown in FIG. 7A and no flow shown in FIG. 7B. Here, incoming sinusoidal velocity signals from right and left velocity sensors 160 and 161, are applied via leads 165 and 166, to integrators 305 and 330, respectively. With fluid flowing in a positive direction, i.e. into meter assembly 10 through inlet 15 (see FIG. 1), the Coriolis forces generated thereby will cause the right (outlet) side leg of flow conduit 130 to pass through its mid-plane of oscillation before the left (inlet) side leg of flow conduit 130 passes through its corresponding mid-plane of oscillation. As a result, the right velocity signal will lead the left velocity signal, as is evident in the velocity waveforms shown in FIG. 7A. This phase difference is linearly proportional to the flow rate. As a result of the operation of integrators 305 and 330, both velocity signals are shifted in phase by ninety degrees and inverted to yield the inverted left and right position signals. The output of integrators 305 and 330 are amplified and clipped by amplifiers 310 and 335, respectively. The resulting clipped left and right position signals, $V_{RP}$ and $V_{LP}$, are compared to respective positive and negative reference levels, $+V_{ref}$ and $-V_{ref}$, by level detectors 315 and 340. Time integrator 345 integrates the time difference existing between the output signals, $V_R$ and $V_L$, produced by level detectors 315 and 340 and appearing on leads 316 and 343, respectively. Reset signal $V_C$, appearing on lead 323, is used to reset integrator 345 and thereby define the point in time at which integration begins. Reset signal $V_C$ is formed by first applying the left velocity signal appearing on lead 165 to amplifier 320 which amplifies and clips this signal and thereafter applying the resulting signal to zero crossing detector 325. Specifically, as illustrated in FIG. 7A, integrator 345 will reset itself during the time interval occurring between a rising edge on reset signal $V_C$ and a rising edge on signal $V_L$ (the reset condition). Thereafter, integrator 345 will negatively integrate the time period occurring between the rising edges on signals $V_L$ and $V_R$ and then positively integrate the time difference occurring between falling edges on signals $V_R$ and $V_L$. The output of integrator 345 is applied to sample and hold (S/H) circuit 350. This circuit samples the output voltage produced by the integrator after positive integration has ceased and before a reset condition has occurred. As a result, this circuit produces a value equivalent to the value of the sampled integrator output voltage. Thereafter, S/H circuit 350 maintains its output at this value during the remainder of the next integration cycle. For a positive flow, the output of S/H circuit 350 will track the net positive voltage $+V_{net}$ produced by integrator 345. This net positive voltage is proportional to the time difference between the velocity signals and hence to the mass flow rate. For flows occurring in the reverse direction, the Coriolis forces are reversed and the net integrator output voltage and that produced by the sample and hold circuit will be negative rather than positive. For conditions of no flow, as shown in FIG. 7B, the left and right velocity waveforms will be in phase as will be the inverted left and right position signals and voltages $V_{RP}$ and $V_{LP}$. Consequently, a zero valued net output voltage will be produced by integrator 345 immediately prior to the occurrence of a reset condition.

The output of sample and hold 350 is smoothed by low pass filter 355 and thereafter applied to voltage-to-frequency converter 360. This converter is adjusted to produce a scaled frequency output on lead 282, typically 0–10,000 Hertz, which is proportional to the range of flow rates that can be measured using meter assembly 10. The signal produced by RTD temperature sensor 190 and appearing on lead 195 is used to vary the scaling of converter 365 for any temperature induced variations in the modulus of rigidity (sheer modulus) of the flow conduit. Specifically, the temperature signal is first linearized by circuit 370 to compensate for the non-linear characteristics of the RTD temperature sensor and thereafter applied over lead 372 to the GAIN input of converter 360. To produce a 4–20 mA analog output signal on lead 281, the frequency output appearing on lead 282 is applied to frequency to 4–20 mA converter 365.

FIG. 8 depicts a block diagram of flow tube drive circuit 40, shown in FIG. 6. This circuit receives the left velocity signal produced by coil 160 and, in response thereto, provides a square wave drive signal to drive drive mechanism (coil) 180 at a frequency equal to the resonant frequency of the flow tube and in phase with its movement. As such, this drive signal injects mechanical energy into flow conduit 130 to overcome inherent mechanical losses and thereby ensures that the flow tube continuously vibrates at its resonant frequency.

Specifically, as shown in FIG. 8, synchronous amplifier 449 produces a square wave that switches from a positive drive level to a negative drive level synchronously with each zero crossing of the left velocity signal, $V_L$, i.e. when both legs of flow conduit 130 simultaneously reach an end point of their oscillatory travel. In particular, during the positive portion of the left velocity signal—as shown by the waveforms appearing in the figure, the synchronous amplifier routes a positive drive level to drive drive coil 180, via lead 185. Likewise, during the negative portion of the left velocity signal, synchronous amplifier 449 routes a negative drive level to lead 185. The left velocity signal, $V_L$, appearing on lead 41 is amplified by amplifier 432 before being applied as a switching signal to synchronous amplifier 449.

The remainder of this circuit sets the proper amplitude (magnitude and sign) for each of these two drive levels. In particular, the left velocity signal is shifted in phase by 90 degrees and then inverted to produce an oscillatory signal, $V_M$, that leads the left velocity signal by 90 degrees. The sign of the anticipatory signal determines what specific drive voltages will be applied to the positive and negative drive level inputs to synchronous amplifier 449 during the next half cycle of the left velocity signal.

Specifically, the sinusoidal left velocity signal, $V_L$, produced by coil 160 is applied, via lead 41, as input to 90 degree phase shifter 431. The sinusoidal output of the phase shifter is applied through amplifier 437 and inverter 439 to yield signal $V_M$ which is, in turn, applied to the inverting input of difference amplifier 443. Signal $V_M$ leads left velocity signal $V_L$ by 90 degrees. Amplifier 437 compares signal $V_M$ against a pre-determined reference level, $V_{LR}$. A comparison occurs at every peak (positive and negative) of signal $V_M$ to determine if this peak value is a positive or negative peak. If the comparison indicates that the peak value lies below a reference level ($V_{LR}$), then this peak value is a negative peak. In this case, difference amplifier 443 will produce a positive level at its output which will result in a positive drive signal being produced by amplifier 445 and applied to the positive drive input to synchronous amplifier 449. Inasmuch, as the positive output of amplifier 445 is inverted by inverter 452, a negative drive signal is applied to the negative drive level input to the synchronous amplifier. To prevent each of these drive signals from changing polarity during the next half cycle of signal $V_M$, differential amplifier 443 samples its inputs and provides a new output value only at the occurrence of a high level on its ENABLE input. In particular, this amplifier is enabled only at each negative going zero crossing in the left velocity signal, $V_L$, by a suitable enable pulse appearing on lead 437. To generate this pulse, the output of amplifier 432 is applied as input to comparator 434 which functions as a zero crossing detector. The output of this detector is a square wave which is in phase with velocity signal $V_L$. This square wave is, in turn, applied as input to negative edge detector 435 which produces a pulse at each negative going transition in this square wave, i.e. at each negative going zero crossing in the left velocity signal. The gain of each amplifier and inverter in circuit 40 is selected to ensure that the magnitude of the drive signal applied to the drive coil is sufficient to vibrate flow conduit 130 in a sinusoidal pattern at its resonant frequency.

It should be clear to those of ordinary skill in the art that the inventive ferromagnetic drive and velocity sensors may be used to fabricate a multi-conduit Coriolis meter system such as that shown in U.S. Pat. No. 4,491,025.

Figure 9:
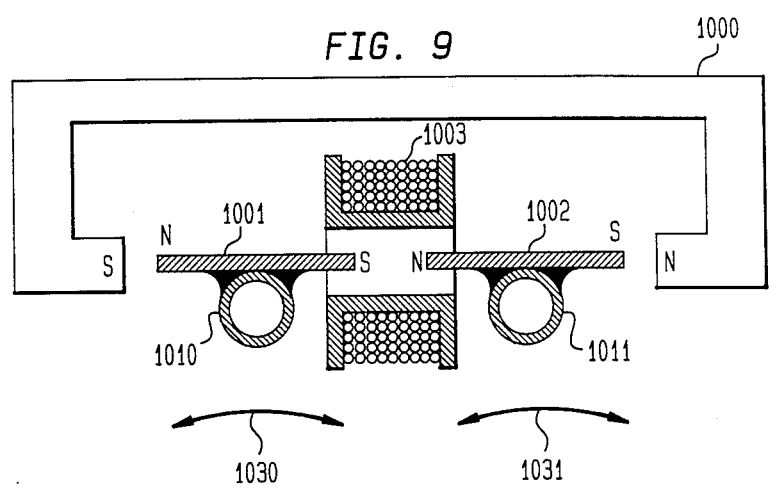
FIG. 9 is a sectional view of an apparatus fabricated in accordance with the present invention for use, as a ferromagnetic drive or as a ferromagnetic velocity sensor, in conjunction with a multi-conduit meter.

In particular FIG. 9 shows an embodiment of an inventive ferromagnetic drive and/or velocity sensor for use in a multi-conduit Coriolis meter system. Ferromagnetic keeper 1001 is brazed to the outer wall of flow conduit 1010 and ferromagnetic keeper 1002 is brazed to the outer wall of flow conduit 1011, these flow conduits being part of a multi-conduit meter system. As described above with respect to the single-conduit systems, keepers 1001 and 1002 each comprise a strip of ferromagnetic material, for example, type 430 stainless steel. External magnet 1000 is a permanent magnet and is positioned in a manner known to those of ordinary skill in the art to align the ferromagnetic domains of keepers 1001 and 1002. As a result, keepers 1001 and 1002 act as small magnets.

Coil 1003 is positioned so that keepers 1001 and 1002 will be influenced by the magnetic field thereof. When an alternating current, such as a sinusoidally varying current, is applied to coil 1003, an alternating magnetic field is produced in the coil. When the alternating magnetic field interacts with the steady field surrounding keepers 1001 and 1002, the alternating field causes a displacement of flow conduits 1010 and 1011 along the direction shown by arrows 1030 and 1031, respectively. This oscillatory motion occurs in the manner described above with respect to the embodiment shown in FIG. 2. The magnetic field produced by external magnet 1000 will orient the magnetic domains within keepers 1001 and 1002 establishing north and south poles as indicated by the letters N and S, respectively in FIG. 9. As a consequence, parallel conduits are driven 180 degrees out of phase to oscillate like the tines of a tuning fork. This is advantageous because it reduces the transmission of vibration from the flow conduits to the attached process piping. In addition, the embodiment of FIG. 9 may be used as a velocity sensor. In accordance with the discussion of the velocity sensor embodiment shown in FIG. 3, a current is induced in coil 1003 as a result of the oscillatory motion of keepers 1001 and 1002 therein. As a result of the opposing direction of oscillation of the two keepers, it is expected that the signal induced in coil 1003 would be representative of the differential velocity between flow conduits 1010 and 1011.

Figure 10:
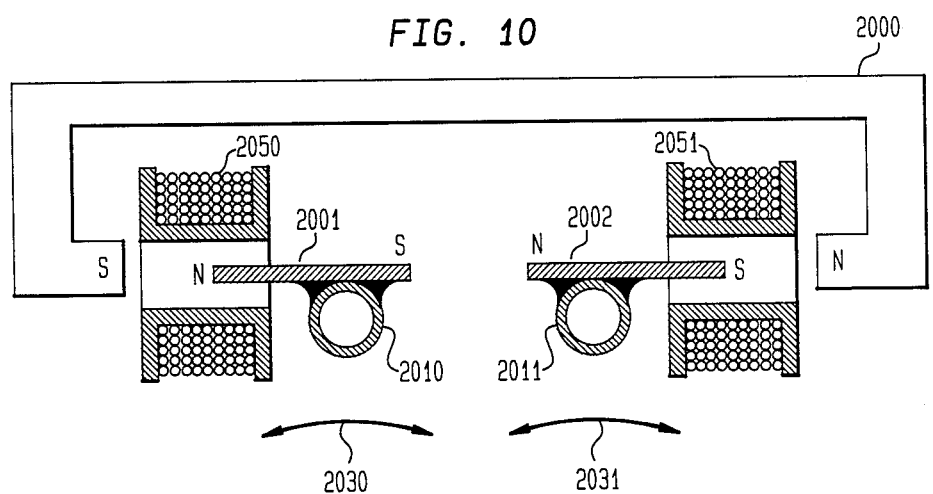
FIG. 10 is a sectional view of an alternative apparatus fabricated in accordance with the present invention for use, as a ferromagnetic drive or as a ferromagnetic velocity sensor, in conjunction with a multi-conduit meter.

FIG. 10 shows a further embodiment of an inventive ferromagnetic drive and/or velocity sensor for use in a multi-conduit Coriolis meter system. Ferromagnetic keeper 2001 is brazed to the outer wall of flow conduit 2010, and ferromagnetic keeper 2002 is brazed to the outer wall of flow conduit 2011, these flow conduits being part of a multi-conduit meter system. As described above with respect to the single-conduit systems, keepers 2001 and 2002 each comprise a strip of ferromagnetic material, for example, type 430 stainless steel. External magnet 2000 is a permanent magnet and is positioned in a manner known to those of ordinary skill in the art to align the ferromagnetic domains of keepers 2001 and 2002. As a result, keepers 2001 and 2002 act as small magnets.

Figure 11:
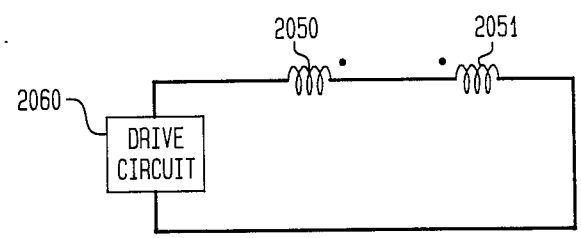
FIG. 11 shows, in pictorial form, a current drive circuit for coils 2050 and 2051 of the embodiment shown in FIG. 10.

Coil 2050 is positioned so that keeper 2001 will be influenced by the magnetic field thereof, and coil 2051 is positioned so that keeper 2002 will be influenced by the magnetic field thereof. When the arrangement shown in FIG. 10 is used as a driver, coils 2050 and 2051 are oppositely wound and electrically connected in the manner shown by the circuit of FIG. 11. By using the circuit shown in FIG. 11, coils 2050 and 2051 are advantageously driven 180 degrees out of phase using drive circuit 2060. In an alternative embodiment, coil 2050 and 2051 may be wound identically and driven by separate drive circuits whose outputs are 180 degrees out of phase with respect to each other. When an alternating current, such as a sinusoidally varying current, is applied to coils 2050 and 2051, respectively, alternating magnetic fields are produced therein. When the alternating magnetic fields interact with the steady field surrounding keepers 2001 and 2002, conduits 2010 and 2011 are displaced along the direction shown in FIG. 10 by arrows 2030 and 2031, respectively. This oscillatory motion occurs in the manner described above with respect to the embodiment shown in FIG. 2. The magnetic field produced by external magnet 2000 will orient the magnetic domains within keepers 2001 and 2002 establishing north and south poles as indicated by the letters N and S, respectively, in FIG. 10. As a consequence, parallel conduits are driven 180 degrees out of phase to oscillate like the tines of a tuning fork. This is advantageous because it reduces the transmission of vibration from the flow conduits to the attached process piping. In addition, the embodiment of FIG. 10 may be used as a velocity sensor. In accordance with the discussion of the velocity sensor embodiment shown in FIG. 3, a current is induced in coils 2050 and 2051 as a result of the oscillatory motion of keepers 2001 and 2002 therein. If the outputs of coils 2050 and 2051 are connected in series, as a result of the opposing direction of oscillation of the two keepers, it is expected that the resultant signal would be representative of the differential velocity between flow conduits 2010 and 2011.

Although a particular embodiment of the present invention has been shown and described herein, many varied embodiments incorporating the teachings of the present invention may be easily constructed by those skilled in the art. For example, the permanent magnets may be replaced with electromagnets which produce relatively constant magnetic fields.

I claim:

1. A Coriolis mass flow meter comprising:
   a first flow tube which is to be placed in oscillatory motion at a pre-defined frequency and in a substantially sinusoidal pattern about a first axis and which will experience twisting movement about a second axis in response to a Coriolis force induced by movement of a fluid through said first flow tube;
   a platform to which both ends of said first flow tube are mounted; and
   a drive mechanism for causing said first flow tube to move in said sinusoidal pattern, wherein said drive mechanism comprises: .
      a first elongated magnetic keeper attached to an outside wall of said first flow tube such that a first end of said first keeper extends away from said first flow tube in a direction substantially parallel to a direction in which said first flow tube is to be sinusoidally moved;
      means affixed to said platform for producing a substantially constant magnetic field in said first keeper so as to suitably orient magnetic domains appearing therein in a direction substantially parallel to the direction in which said first flow tube is to move in said sinusoidal pattern;
      a first coil, fixedly located in relation to said platform and proximate to said constant field producing means, for producing a magnetic field that combines with the constant field so as to produce a composite magnetic field in said first keeper;
      means for applying a sinusoidally varying voltage to said first coil so as to sinusoidally vary said composite magnetic field and thereby cause said first keeper and the first flow tube attached thereto to move in said substantially sinusoidal pattern.

2. The Coriolis meter in claim 1 wherein said keeper comprises a first elongated piece of ferromagnetic material which is attached in the vicinity of a second end thereof to the outside wall of said flow tube.

3. The Coriolis meter in claim 2 further comprising a first annularly shaped bobbin having a hollow core which is adapted to receive a first end of said first piece for reciprocal motion within said core and wherein said first coil is wound on said first bobbin.

4. The Coriolis meter in claim 3 wherein said constant field producing means comprises a pole piece to which said first bobbin is affixed.

5. The Coriolis meter in claim 4 wherein said constant field producing means further comprises a permanent magnet and wherein said keeper is a strip of material fabricated primarily from a group comprising Mumetal, type 430 stainless steel and carbon steel.

6. The Coriolis meter in claim 1 further comprises a second flow tube substantially similar to said first flow tube and oriented substantially parallel to said first flow tube, and wherein said drive mechanism further comprises:
   a second elongated magnetic keeper attached to an outside wall of said second flow tube such that a first end of said second keeper extends away from said second flow tube in a direction substantially parallel to a direction in which said second flow tube is to be sinusoidally moved;

a second coil, fixedly located in relation to said platform and proximate to said constant field producing means, for producing a magnetic field that combines with the constant field to produce a second composite magnetic field in said second keeper;

means for applying a sinusoidally varying voltage to said second coil so as to sinusoidally vary said second composite magnetic field and thereby cause said second keeper and the second flow tube attached thereto to move in a substantially sinusoidal pattern.

7. The Coriolis meter in claim 6 wherein said keeper comprises an elongated piece of ferromagnetic material which is attached in the vicinity of a second end thereof to the outside wall of said flow tube.

8. The Coriolis meter in claim 7 further comprising a second annularly shaped bobbin having a hollow core which is adapted to receive a first end of said second piece for reciprocal motion within said core, and wherein said second coil is wound on said bobbin and said constant field producing means comprises a pole piece to which said second bobbin is affixed.

9. The Coriolis meter in claim 8 wherein said constant field producing means further comprises a permanent magnet and wherein said second keeper is a strip of material fabricated primarily from a group comprising Mumetal, type 430 stainless steel and carbon steel.

10. The Coriolis meter in claim 1 further comprising a second flow tube substantially similar to said first flow tube and oriented substantially parallel to said first flow tube; and wherein said drive mechanism further comprises:
a second elongated magnetic keeper attached to an outside wall of said second flow tube such that a first end of said second keeper extends away from said second flow tube in a direction substantially parallel to a direction in which said second flow tube is to be sinusoidally moved, said first and second keepers being appropriately oriented such that the first ends of said first and second keepers extend towards each other; and said first coil is appropriately positioned between said first ends of said first and second keepers such that said first ends of said first and second keepers can reciprocally move within respective and opposite ends of the core of said first coil and thereby cause said first and second keepers and the first and second flow tubes respectively attached thereto to move in opposing substantially sinusoidal patterns whenever an appropriate sinusoidal voltage is applied to said first coil.

11. The Coriolis meter in claim 10 wherein said first and second keepers respectively comprise first and second elongated pieces of ferromagnetic material which are attached in the vicinity of a second end thereof to the outside wall of said first and second flow tubes, respectively.

12. The Coriolis meter in claim 11 wherein said constant field producing means comprises a permanent magnet and wherein said first and second keepers respectively comprise a strip of material fabricated primarily from a group comprising Mumetal, type 430 stainless steel and carbon steel.

13. A Coriolis mass flow meter comprising:
a flow tube which is to be placed in oscillatory motion at a pre-defined frequency and in a substantially sinusoidal pattern about a first axis and which will experience twisting movement about a second axis in response to a Coriolis force induced by movement of a fluid through said flow tube;

a platform to which both ends of said flow tube are mounted; and a velocity sensor for producing a signal that varies as a function of the velocity of said flow tube, wherein said velocity sensor comprises:
an elongated magnetic keeper attached to an outside wall of said flow tube such that a first end of said keeper extends away from said flow tube in a direction substantially parallel to a direction in which said flow tube will move in said sinusoidal pattern;

means affixed to said platform for producing a substantially constant magnetic field in said keeper so as to suitably orient magnetic domains appearing therein in a direction substantially parallel to the direction in which said flow tube is to move about said first axis; and a coil fixedly located in relation to said platform and proximate to said constant field producing means for producing said signal as said keeper and said flow tube attached thereto move about said first axis, wherein said coil is suitably positioned within said field such that flux density of the field to which the coil is subjected varies in response to movement of said keeper with respect to said coil.

14. The Coriolis meter in claim 13 wherein said keeper comprises a first elongated piece of ferromagnetic material which is attached in the vicinity of a second end thereof to the outside wall of said flow tube.

15. The Coriolis meter in claim 14 further comprising an annularly shaped bobbin having a hollow core which is adapted to receive a first end of said piece for reciprocal motion within said core and wherein said coil is wound on said bobbin.

16. The Coriolis meter in claim 15 wherein said constant field producing means comprises a pole piece to which said bobbin is affixed.

17. The Coriolis meter in claim 16 wherein said constant field producing means further comprises a permanent magnet and wherein said keeper is a strip of material fabricated primarily from a group comprising Mumetal, type 430 stainless steel and carbon steel.

18. A Coriolis mass flow meter comprising:
a flow tube which is to be placed in oscillatory motion at a pre-defined frequency and in a substantially sinusoidal pattern about a first axis and which will experience twisting movement about a second axis in response to a Coriolis force induced by movement of a fluid through said flow tube;

a platform to which both ends of said flow tube are mounted;

a drive mechanism for causing said flow tube to move in said sinusoidal pattern, wherein said drive mechanism comprises:
a first elongated magnetic keeper attached to an outside wall of said flow tube such that a first end of said first keeper extends away from said flow tube in a direction substantially parallel to a direction in which said flow tube is to be sinusoidally moved;

means affixed to said platform for producing a first substantially constant magnetic field in said first keeper so as to suitably orient magnetic domains appearing therein in a direction substantially parallel to the direction in which said flow tube is to move in said sinusoidal pattern;

a first coil, fixedly located in relation to said platform and proximate to said first constant field producing means, for producing a magnetic field that combines with the first constant field to produce a composite magnetic field in said first keeper; and means for applying a sinusoidally varying voltage to said first coil so as to sinusoidally vary said composite magnetic field and thereby cause said first keeper and the flow tube attached thereto to move in said substantially sinusoidal pattern; and a velocity sensor for producing a signal that varies as a function of the velocity of said flow tube, wherein said velocity sensor comprises:

a second elongated magnetic keeper attached to an outside wall of said flow tube such that a first end of said second keeper extends away from said flow tube in a direction substantially parallel to a direction in which said flow tube will move in said sinusoidal pattern;

means affixed to said platform for producing a second substantially constant magnetic field in said second keeper so as to suitably orient magnetic domains appearing therein in a direction substantially parallel to the direction in which said flow tube is to move about said first axis; and a second coil fixedly located with relation to said platform and proximate to said constant field producing means for producing said signal as said second keeper and said flow tube attached thereto move about said first axis, wherein said second coil is suitably positioned within said second field such that flux density of the field to which the second coil is subjected varies in response to movement of said keeper with respect to said coil.

19. The Coriolis meter in claim 18 wherein said first and second keepers comprise corresponding first and second elongated pieces of ferromagnetic material which are both attached in the vicinity of a respective second end thereof to the outside wall of said flow tube.

20. The Coriolis meter in claim 19 further comprising first and second annularly shaped bobbins, each bobbin having a hollow core, wherein said first and second bobbins are adapted to receive the first ends of said first and second pieces, respectively, for reciprocal motion within their respective cores; and wherein said first and second coils are wound on said first and second bobbins, respectively.

21. The Coriolis meter in claim 20 wherein said first and second constant field producing means comprise a permanent magnet and wherein said first and second keepers are each a strip of material fabricated primarily from a group comprising Mumetal, type 430 stainless steel and carbon steel.

* * * * *